United States Patent [19] [11] 4,084,459
Clark [45] Apr. 18, 1978

[54] METHOD AND APPARATUS FOR LENS TURNING
[75] Inventor: James A. Clark, Honeoye Falls, N.Y.
[73] Assignee: Bausch & Lomb Incorporated, Rochester, N.Y.
[21] Appl. No.: 775,001
[22] Filed: Mar. 7, 1977
[51] Int. Cl.² .................. B23B 5/40; B23B 25/06
[52] U.S. Cl. .................. 82/1 C; 51/124 L; 51/284 R; 82/12
[58] Field of Search .............. 82/1 C, 11, 12; 51/58, 51/101 LG, 124 L, 284 R

[56] References Cited
U.S. PATENT DOCUMENTS

| 2,556,604 | 6/1951 | Suddarth et al. | 51/124 L |
| 3,079,731 | 3/1963 | Rawstron et al. | 51/124 L |
| 3,835,588 | 3/1973 | Whitham | 82/12 X |

Primary Examiner—Robert Louis Spruill
Attorney, Agent, or Firm—Frank C. Parker; DeWitt M. Morgan

[57] ABSTRACT

Apparatus for and method of forming a surface on, for instance, a contact lens. The apparatus includes first and second movable members. The first member is pivotally connected to suitable support structure for rotation about a first axis. The second member, which supports a cutting tool, is pivotally connected to the first member for rotation about a second axis. This second axis is offset from the first axis so that it (the second axis) rotates or pivots about the first axis when the first member is rotated. The apparatus also includes a cam surface and a cam follower. In the first embodiment the cam follower is located on the second member and the cam surface is located on a cam or third member which is pivotally connected to the support structure for rotation about a third axis. This third member is also interconnected with the first member so that rotation of the third member rotates or pivots the first member about the first axis. In an alternate embodiment, the cam follower is secured to the support structure and the cam surface is provided on the second member. In operation, the second member is rotated about the second axis until relative movement between the cam follower and the cam surface induces movement of the first member about the first axis to thereby continuously shift the position of the second axis. With the first member in motion, a suitable cutting tool secured to the second member undergoes a dual movement (rotation about the second axis plus simultaneous movement with the second axis as it pivots relative to the first axis) to form an aspheric surface on the contact lens.

11 Claims, 4 Drawing Figures

METHOD AND APPARATUS FOR LENS TURNING

DESCRIPTION OF THE PRIOR ART

U.S. Pat. No. 3,835,588 discloses a turning attachment, for use in conjunction with a lathe, to form the convex side of a contact lens. The turning attachment includes a first member or plate that supports a cutting tool and which freely pivots relative to a second or intermediate member through a limited arc. This second member is, in turn, pivotally connected to a base plate assembly which, in its turn, is secured to the bed of a lathe. The second member is provided with what is termed "a lost motion connection" consisting of a rod like member with a stop secured thereto. Clockwise movement of the first member about its axis, from its initial rest position to the position where it engages the stop of the lost motion connection, generates a first spherical surface on the lens blank. After engagement with the stop, the first and second members swing as a unit around the axis of rotation of the second member to generate the peripheral or outer curvature of the optical surface on the lens blank. Thus, once the first member has engaged the stop, rotation about the first axis ceases and all motion is shifted to rotation about a second axis. Further, as is evident from inspection of FIGS. 7 and 8 of the aforesaid patent, there is a sharp discontinuity between the two curvatures generated on the convex side of the respective lenses.

SUMMARY OF THE INVENTION

Apparatus for and method of forming a surface on a workpiece. The apparatus includes a support and first and second members or plates. The first member is connected to the support for rotation about a first axis. The second member is pivotally connected to the first member for rotation about a second axis which is fixed with respect to the first member. The apparatus also includes structure which, in response to the rotation of the second member, about the second axis rotates the first member about the first axis. The movement of the first member about the first axis is simultaneous with at least a portion of the movement of the second member about the second axis.

Movement of the first member about the first axis, in response to movement of the second member about the second axis, may be accomplished by a cam mechanism. A cam surface may be provided on either the support or the second member and a cam follower may be secured to the other of the support or the second member for engagement with the cam surface. Movement of one of the cam follower and cam surface along the other one of the cam follower and cam surface, in response to movement of the second member about the second axis, rotates the first member and, consequently, the second axis about the first axis.

In a preferred embodiment, a third member or plate, pivotally connected to the support for rotation about a third axis, may be provided for supporting one of the cam surface or the cam follower. A linkage mechanism is also provided interconnecting the third member with the first member whereby movement of the third member about the third axis, in response to movement of the cam follower relative to the cam surface, causes the first member to pivot about the first axis.

The method includes: (1) rotating the workpiece; (2) engaging a cutting tool, suitably supported on the second member, with the workpiece; (3) rotating the second member about the second axis; and (4) during a portion of the rotation of the second member about the second axis, simultaneously rotating the first member about the first axis to thereby move the second axis about the first axis.

DESCRIPTION OF THE PREFERRED EMBODIMENT

Figure 1:
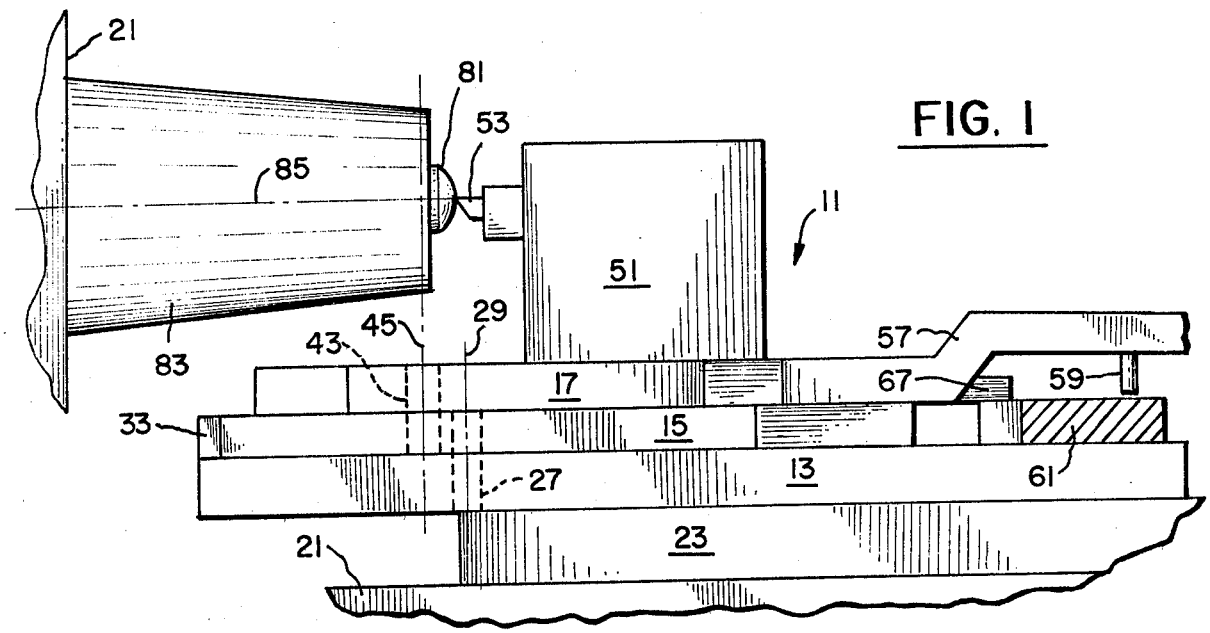
FIG. 1 is a side view, partly in section and partly broken away, of one embodiment of the invention.
Figure 2:
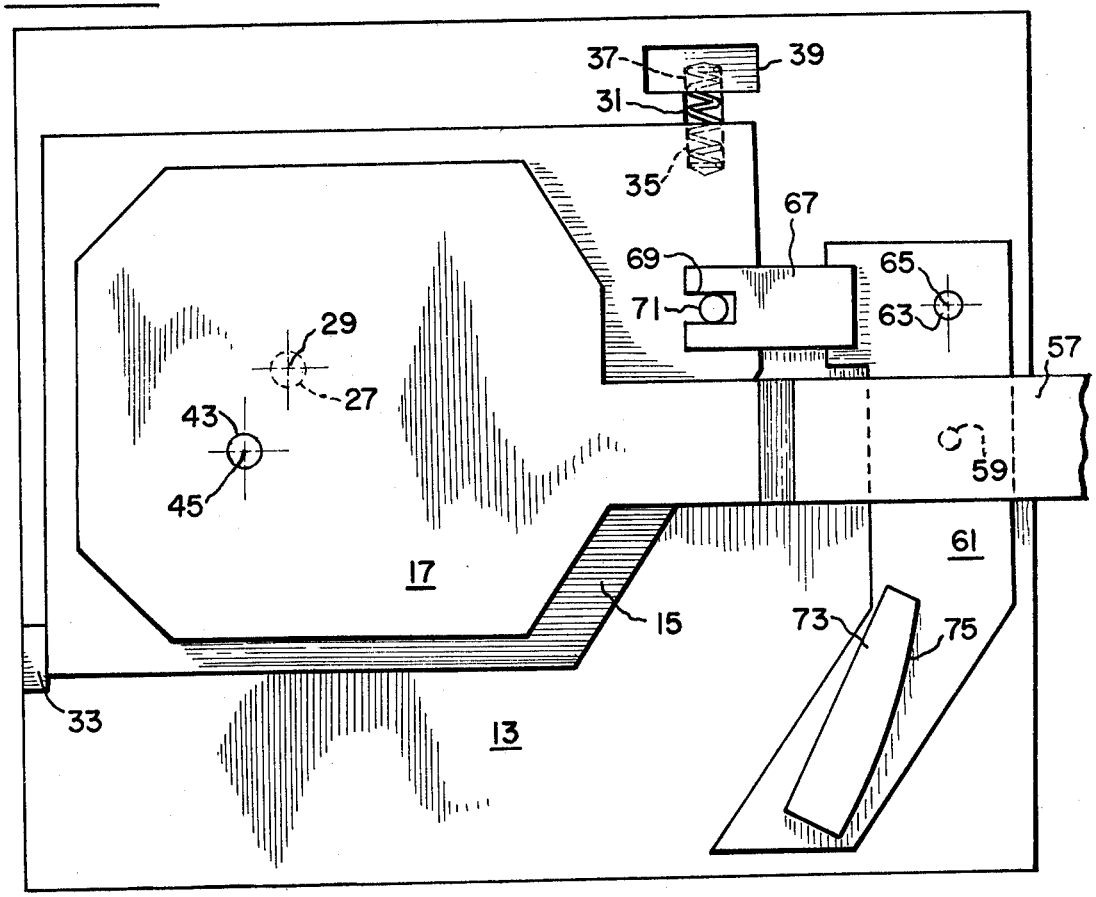
FIG. 2 is a top view of the apparatus illustrated in FIG. 1 with the tool holder, cutting tool, workpiece and chuck removed for clarity.

As illustrated in FIGS. 1 and 2, turning attachment 11 includes a base or support plate 13, first or intermediate pivot plate 15 and a second or tool support plate 17. Though base plate 13 may be of any suitable configuration, it is illustrated in the form of a rectangular plate of uniform thickness. As is also evident from FIG. 1, the base plate 13 is attached to a lathe 21 via a compound rest or table 23 having, for instance, X and Y axis movement. As rest 23 is of conventional design no details are shown.

Intermediate pivot plate 15 is rotatably attached to base plate 13 by pivot pin 27 received within suitable bearings (not shown) provided in both intermediate pivot plate 15 and base plate 13. This arrangement permits relative rotation between base plate 13 and intermediate pivot plate 15 about axis 29 which is perpendicular to the plane of base plate 13. To minimize friction between intermediate pivot plate 15 and base plate 13, suitable bearing surfaces (not shown) may be provided on one, the other, or both of base plate 13 and intermediate pivot plate 15. Further, intermediate pivot plate 15 is biased by compression spring 31 into engagement with stop 33 fixed to base plate 13. Spring 31 is captured by a recess 35 provided an intermediate pivot plate 15 and a recess 37 provided in upstanding block 39 which is also fixed to base plate 13.

Tool support plate 17 is pivotally attached to intermediate pivot plate 15 by pivot pin 43 received within suitable bearings (not shown) provided in both intermediate pivot plate 15 and tool support plate 17 so as to permit arcuate movement of tool support plate 17 relative to intermediate pivot plate 15 about axis 45. To minimize friction therebetween, suitable bearings or bearing surfaces (not shown) may be provided on or between intermediate pivot plate 15 and tool support plate 17. As is evident from FIGS. 1 and 2, axis 45 is offset from and substantially parallel to axis 29. As is also illustrated in FIG. 1, tool support plate 17 supports a tool holder schematically illustrated at 51 which, in turn, supports a cutting tool 53 of suitable configuration. Tool holder 51 is of conventional design and, preferably, includes apparatus (not shown) to adjust the location of tool 53 relative to tool support plate 17. Alternately, a rotating ring type tool may be attached to tool support plate 17. Finally, tool support plate includes a lever arm 57 to facilitate rotation about axis 45.

Arm 57 may be hand or power operated. As is illustrated in FIG. 1, on the underside of lever arm 57 is located a cam follower 59.

Turning attachment 11 also includes a cam arm 61 attached to base plate 13 via pivot pin 63 for rotation about axis 65. To minimize friction therebetween, a suitable bearing mechanism may be provided between cam arm 61 and base plate 13. Cam arm 61 also includes a leg 67 which is provided with a slot 69 in which is received a pin 71 secured to intermediate pivot plate 15 to thereby interconnect cam arm 61 with intermediate pivot plate 15. Cam arm 61 also includes a cam 73 having cam surface 75 positioned as illustrated in FIG. 2. The position of cam 73 on cam arm 61 may be adjusted or varied by any suitable position adjusting mechanism.

Cam surface 75 is configured and/or its position adjusted so that, with cam arm 61 in its rest position such as illustrated in FIG. 2, the linear distance between axis 45 and cam surface 75 varies for successive positions along cam surface 75. The amount of variation and whether the linear distance between axis 45 and cam surface 75 increases and/or decreases depends upon the particular configuration desired on the peripheral portion of, for instance, the lens to be cut. With intermediate pivot plate 15 biased into engagement with stop 33 as illustrated in FIG. 2, cam surface 75 must be positioned so that cam arm 61 is moved in a clockwise direction from its rest position. For cam arm 61 to move in a counterclockwise direction from its rest point, the location of stop 33 and spring 31 would have to be reversed. Further, as would be obvious to those skilled in the art, that to permit both generally clockwise and generally counterclockwise movement of cam arm 61, combined stop-biasing structure could be provided at the location illustrated for stop 33 and at the location illustrated for spring 31.

As will be evident to those skilled in the art, apparatus 11 is configured so that the distance between cam surface 75 and axis 65 is greater than the distance between slot 69 and axis 65, so that movement of surface 75 about axis 65 produces a proportionally smaller movement in slot 69 and, hence, in pin 71. Further, because the linear distance between axis 29 and pin 71 is considerably larger than the linear distance between axis 29 and axis 45 movement of pin 71 produces a proportionally smaller movement of pin 43 relative to pin 27. This double reduction of 10 to 1, approximately, takes the sensitivity out of cam surface 75.

In operation, workpiece 81 is secured in chuck 83 of lathe 21. Turning attachment 11 is then positioned relative to workpiece 81 such that axis of rotation 85 intersects axis 45. Further, the height of tool 53 is adjusted so as to be on center with axis 85. Lever arm 57 is then moved in a clockwise direction (as viewed in FIG. 2) through a first arc until cam follower 59 engages cam surface 75. This first movement causes tool support plate 17 and, hence, tool 53 to pivot about axis 45 which remains stationary relative to workpiece 81. Since axis 45 intersects the axis of rotation 85 the surface cut on the center of workpiece 81 is in the form of a section of a sphere. Thus, for generating a spherical surface on the central portion of workpiece 81, cam follower 59 need not be in engagement with cam surface 75.

Once cam follower 59 is in engagement with cam surface 75, additional movement of lever arm 57 in a clockwise direction pulls cam surface 75 toward axis 45. This pulling action causes cam arm 61 to pivot in a clockwise direction about axis 65 which, through the connection formed by slot 69 and pin 71, rotates intermediate pivot plate 15 in a counterclockwise direction about axis 29. Movement of intermediate pivot plate 15 in turn, moves pivot pin 43 and, hence, axis 45 in a counterclockwise direction about axis 29, which is fixed relative to base plate 13. Further, movement of axis 45 automatically changes the position of tool 53 relative to workpiece 81 so as to generate, on the peripheral portion of workpiece 81, a surface different from the surface generated in the center of workpiece 81. This second surface may be spherical or aspherical depending upon the configuration of cam surface 73.

In the embodiment illustrated in FIGS. 1 and 2, tool 53 is located on tool support plate 17 between pivot pin 43 and cam follower 59 with the point of tool 53 preferably oriented so as to be perpendicular with the surface generated during the generation of the spherical surface on the central portion of workpiece 81. From inspection of FIG. 2, it will be appreciated that the imaginary line interconnecting axes 29 and 45 is generally perpendicular to the imaginary lines between axis 45 and the successive points of engagement between cam follower 59 and cam surface 75. This spatial relationship insures that, as tool support plate 17 moves simultaneously about axis 45 and with axis 45 relative to axis 29, tool 53 moves in a direction along the imaginary interconnecting axis 45 with the point of engagement between cam follower 59 and cam surface 75 (generally perpendicular with the imaginary line interconnecting axes 29 and 45). This, in turn, keeps the point of tool 53 generally perpendicular to the surface being generated on the peripheral portion of workpiece 81. The direction of movement along the imaginary line interconnecting axis 45 with the point of engagement of cam follower 59 with cam surface 75 will depend upon the direction of movement (either clockwise or counterclockwise) of cam plate 61 about pivot 63. As illustrated in FIG. 2, the movement of tool 53 will be away from workpiece 81.

Several variations of the foregoing embodiment are contemplated. First a cam which is not the section of an arc centered about axis 45, can be extended so that cam follower 59 is always in engagement therewith. With such an arrangement a completely aspherical surface would be generated on workpiece 81. Cam follower 59 can be made adjustable relative to tool support plate 17. Further, cam follower 59 can be interchanged with cam 73.

Figure 3:
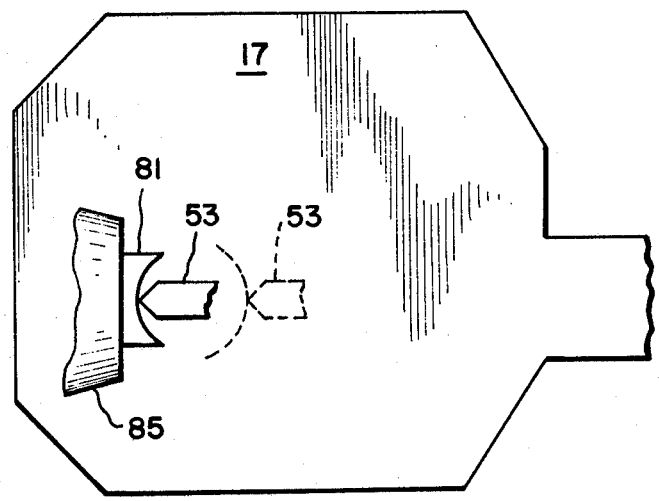
FIG. 3 is a partial top view of the apparatus illustrated in FIG. 1.

It will also be appreciated by those skilled in the art that concave surfaces as well as convex surfaces can be turned on workpiece 81. With reference to FIG. 3, if the point of tool 53 is to the right of axis 45 a convex surface will be cut. However, if the point of tool 53 is shifted so that it is to the left of axis 45 a concave surface will be turned.

Figure 4:
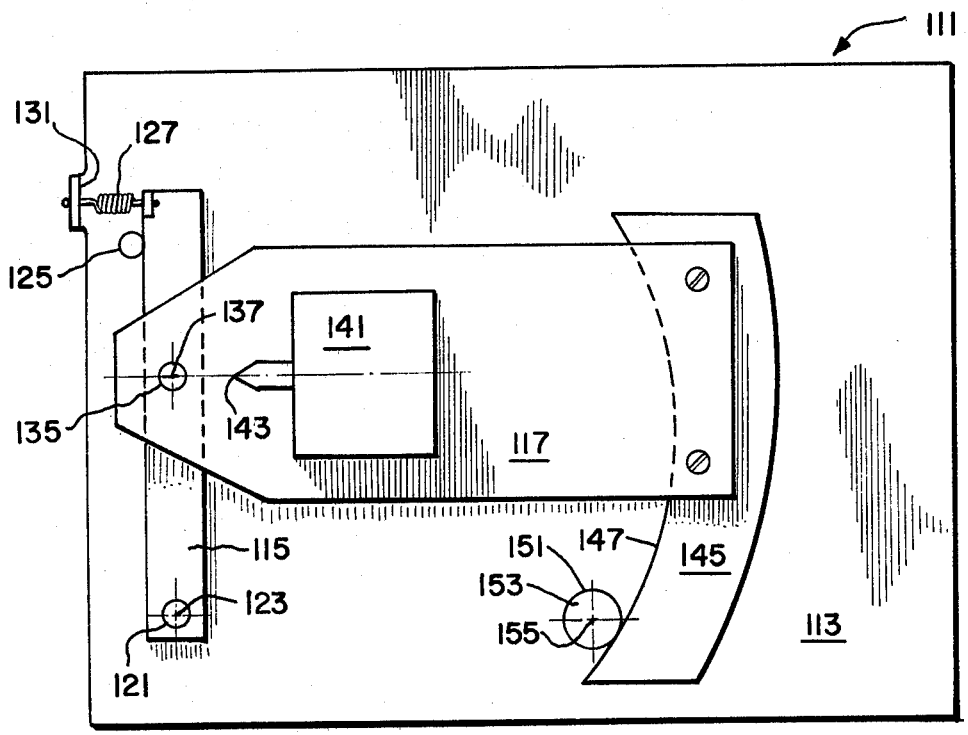
FIG. 4 is a top view of an alternate embodiment of the invention.

Alternate turning attachment 111 is illustrated in FIG. 4. This embodiment includes a base or support plate 113, a first or an intermediate pivot plate 115 and a second or tool support plate 117. Support 113 takes the form of a flat rectangular plate of uniform thickness which, like the previous embodiment, may be supported on a conventional compound rest (not shown) that, in turn, is attached to a conventional lathe (also not shown).

Intermediate pivot plate 115 is rotatably attached to support 113 by pivot pin 121 received within suitable bearings (not shown) provided in both support 113 and intermediate pivot plate 115. This arrangement permits relative rotation between support 113 and intermediate pivot plate 115 about axis 123 which is perpendicular to the plane of support 113. Intermediate pivot plate 115 is biased into engagement with stop 125 by tension spring 127 is secured between the free end of intermediate support plate 115 and post 131.

Tool support plate 117 is pivotally attached to intermediate support plate 115 by pivot pin 135 received within suitable bearings (not shown) provided in both intermediate support plate 115 and tool support plate 117. This arrangement permits arcuate movement of tool support plate 117 relative to intermediate pivot plate 115 about axis 137. As is evident from inspection of FIG. 4, axis 137 is offset from and parallel to axis 123. As is also illustrated in FIG. 4, tool support plate 117 supports a tool holder 141 which, in turn, supports a cutting tool 143 of suitable configuration. Tool holder 141 is of conventional design and includes apparatus (not shown) to adjust the location of tool 143 relative to tool support plate 117.

Attached to the free end of tool support plate 117 is a cam 145 including a cam surface 147. Surface 147 cooperates with surface 151 provided on roller 153 which is fixed to support 113 and rotates about axis 155. Cam surface 147 is configured so that for at least a portion thereof, the linear distance between axis 137 and cam surface 147 varies for successive positions along cam surface 147. By, as viewed in FIG. 4, decreasing the linear distance in a counterclockwise direction along surface 147, intermediate support plate 115 will pivot in a clockwise direction about axis 123 as tool support plate 117 rotates in a clockwise direction about axis 137. As with the previous embodiment, the rotation of intermediate support plate 115 about axis 123 will be simultaneous with at least a portion of the movement of tool support plate 117 about axis 137 to thereby give tool 143 a compound motion.

Whereas the drawing and accompanying description have shown and described several preferred embodiments of the present invention, it should be apparent to those skilled in the art that various changes may be made in the form of the invention without affecting the scope thereof.

I claim:

1. Apparatus for forming a surface on a workpiece, said apparatus comprising:
   (a) support means;
   (b) a first member pivotally connected to said support means for rotation about a first axis;
   (c) a second member pivotally connected to said first member for rotation about a second axis, said second axis being offset from and substantially parallel to said first axis; and
   (d) means, responsive to rotation of the second member about said second axis, for rotating said first member about said first axis, said rotation of said first member about said first axis being simultaneous with at least a portion of said rotation of said second member about said second axis whereby said second axis may rotate about said first axis while said second member rotates about said second axis.

2. The apparatus as set forth in claim 1 wherein said means for rotating said first member about said first axis includes a cam having a cam surface and a cam follower, said cam being secured to one of said support means and said second member, said cam follower being secured to the other of said support means and said second member.

3. The apparatus as set forth in claim 2 further including:
   (a) a third member pivotally connected to said support means for rotation about a third axis, one of said cam and said cam follower being secured to said third member; and
   (b) linkage means, provided on said third member and said first member, for pivoting said first member about said first axis in response to movement of said third member about said third axis.

4. The apparatus as set forth in claim 3 wherein said linkage means includes a slot provided on one of said first member and said third member, and a pin provided on the other of said first member and said third member, said pin being received within said slot.

5. The apparatus as set forth in claim 4 wherein said one of said cam and said cam follower is spaced from said third axis a distance which is greater than the distance between said third axis and said linkage means whereby movement of said one of said cam and said cam follower about said third axis results in a correspondingly smaller movement of said linkage means.

6. The apparatus as set forth in claim 5 wherein the distance between said linkage means and said first axis is greater than the distance between said first axis and said second axis, whereby movement of said linkage means about said first axis results in correspondingly smaller movement of said second axis.

7. The apparatus as set forth in claim 2 wherein said cam follower is secured to said support means and wherein said cam is secured to said first member.

8. A turning attachment comprising:
   (a) support means;
   (b) an intermediate support, said intermediate support pivotally connected with said support means for rotation about a first axis;
   (c) a tool support, said tool support pivotally connected with said intermediate support for rotation about a second axis, said tool support including a cam follower;
   (d) cam support means, said cam support means pivotally connected with said support means for rotation about a third axis, said cam support means including a cam; and
   (e) linkage means provided on said cam support means and said intermediate support whereby, movement of said cam plate, in response to movement of said cam follower along said cam surface, moves said intermediate support about said first axis to thereby move said second axis about said first axis.

9. A turning attachment comprising:
   (a) a base member, said base member including a first pivot means having an axis;
   (b) a first member mounted on said first pivot means for movement about said first pivot axis relative to said base member, said first member including a second pivot means having an axis;
   (c) a second member mounted on said second pivot means for movement about said second pivot axis relative to said first member, said second member including a cam follower means;
   (d) a cam support means including a cam having a cam surface;
   (e) means for interconnecting said cam support means with said base member for rotation about a third axis in response to movement of said cam follower along said cam surface; and (f) means, provided on said cam support means and said first member, for pivoting said first member about said first axis in response to movement of said cam support means about said third axis to thereby move said second pivot means about said first pivot means.

10. A turning attachment comprising:
(a) a base member, said base member including a first pivot and a cam follower, said first pivot means having an axis;
(b) a first member mounted on said first pivot means for movement about said first pivot axis relative to said base member, said first member including a second pivot means having an axis; and
(c) a second member mounted on said second pivot for movement about said second pivot axis relative to said first member, said second member including a cam surface engageable with said cam follower whereby rotation of said second member about said second pivot axis rotates said first member about said first pivot axis to thereby move said second pivot axis.

11. A method of forming a surface on workpiece, such as a lens, with a cutting means attached to turning attachment and with means for supporting and rotating said workpiece, said attachment including first and second relatively pivotal members, said cutting means attached to said second member, said first member pivoting about a first axis, said second member pivotally connected to said first member for rotation relative to said first member about a second axis, and means, responsive to the rotation of second member, for simultaneously rotating said first member about said first axis during at least a portion of the movement of said second member about said second axis, said method comprising:
(a) rotating said workpiece;
(b) engaging said cutting means with said workpiece;
(c) rotating said second member about said second axis; and
(d) while rotating said second member about said second axis, rotating said first member about said first axis to rotate said second axis about said first axis to thereby impart a compound movement to said cutting means.

* * * * *